United States Patent
Keller et al.

(10) Patent No.: US 10,216,272 B2
(45) Date of Patent: Feb. 26, 2019

(54) STRAIN MEASUREMENT RING

(71) Applicant: Facebook Technologies, LLC, Menlo Park, CA (US)

(72) Inventors: Sean Jason Keller, Kirkland, WA (US); David R. Perek, Bellevue, WA (US); Tristan Thomas Trutna, Seattle, WA (US); Garett Andrew Ochs, Seattle, WA (US); Nicholas Roy Corson, Mukilteo, WA (US); Raymond King, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 184 days.

(21) Appl. No.: 15/247,095

(22) Filed: Aug. 25, 2016

(65) Prior Publication Data

US 2018/0059787 A1    Mar. 1, 2018

(51) Int. Cl.
*G06F 3/01* (2006.01)
*G06F 3/0338* (2013.01)
*H04B 10/114* (2013.01)
*G06F 3/038* (2013.01)

(52) U.S. Cl.
CPC .............. *G06F 3/014* (2013.01); *G06F 3/011* (2013.01); *G06F 3/016* (2013.01); *G06F 3/0338* (2013.01); *G06F 3/0383* (2013.01); *H04B 10/114* (2013.01); *G06F 2203/0331* (2013.01); *G06F 2203/0384* (2013.01)

(58) Field of Classification Search
CPC .......... G06F 3/014; G06F 3/011; G06F 3/016; G06F 3/0346; G06F 3/0383; G06F 3/0414; G06F 3/04842; G06F 3/017; G06F 2203/0331; G06F 2203/0335; G06F 1/163; G06F 15/0216; A61H 2201/165
See application file for complete search history.

(56) References Cited

U.S. PATENT DOCUMENTS

| | | | | |
|---|---|---|---|---|
| 4,905,001 A | * | 2/1990 | Penner | G06F 3/014 340/407.1 |
| 2007/0103430 A1 | * | 5/2007 | Nishi | G06F 3/014 345/156 |
| 2009/0096746 A1 | * | 4/2009 | Kruse | G06F 3/014 345/156 |
| 2012/0075173 A1 | * | 3/2012 | Ashbrook | G06F 3/014 345/156 |

(Continued)

*Primary Examiner* — Nalini Mummalaneni
(74) *Attorney, Agent, or Firm* — Fenwick & West LLP

(57) ABSTRACT

A strain measurement ring measures strain information describing deformation of a strain-sensitive element included in the strain measurement ring due to movement of a user's finger. The strain measurement ring includes a semi-rigid band coupled to a deformable band, which together encompass a portion of the user's body. The semi-rigid band includes two coupling ends each coupled to a respective coupling end of the deformable band. The deformable band includes the strain-sensitive element. The strain measurement ring may include an emitter to transmit strain information to a virtual reality/augmented reality (VR/AR) console. The strain measurement ring may include an actuator to change the tension of the deformable band in response to haptic command signals from a VR/AR console. As a result, the strain measurement ring may apply pressure to the user's skin to simulate contact with a virtual object.

20 Claims, 5 Drawing Sheets

(56) References Cited

U.S. PATENT DOCUMENTS

| | | | | |
|---|---|---|---|---|
| 2015/0277559 A1* | 10/2015 | Vescovi | ............... | G06F 3/014 |
| | | | | 345/173 |
| 2015/0346892 A1* | 12/2015 | Parham | ............... | G06F 3/0304 |
| | | | | 345/166 |
| 2016/0116941 A1* | 4/2016 | Kuwabara | ............... | G06F 1/163 |
| | | | | 361/679.03 |

* cited by examiner

STRAIN MEASUREMENT RING

BACKGROUND

The present disclosure generally relates to devices that facilitate user interaction with virtual objects, and specifically to sensors that measure movements of a user's digits and that measure contact of the user's digits with a real object.

Virtual reality and augmented reality (VR/AR) systems often include devices, such as a VR/AR headset and headphones, which operate together to provide multiple forms of sensory output that create the illusion that a user is immersed in a virtual world or augmented world. A VR/AR system can also include an input device such as a VR glove that allows a wearer of the glove some limited interaction with virtual objects (e.g., picking up a virtual object). However, conventional VR gloves have limited fidelity in detecting user interactions with virtual objects. Additionally, conventional VR gloves provide little feedback to the user to help the interaction with the virtual object feel like an interaction with a real object. Furthermore, conventional VR gloves may have difficulty detecting user interactions with real objects.

SUMMARY

A strain measurement ring measures strain information describing deformation of a strain-sensitive element associated with movement of a user's finger. The user's finger may move as the user interacts with real objects or virtual objects, or as the user otherwise makes inputs to a virtual reality and/or augmented reality (VR/AR) system. The strain-sensitive element may also deform as pressure on a user's skin changes due to interactions with a real object. The strain measurement ring sends the strain information to a VR/AR console, which determines that the user's finger is moving to make an input to the VR/AR system in response to the strain information. For example, the VR/AR system determines that the user is interacting with a real object or virtual object in response to the strain information. The VR/AR console may send haptic command signals to the strain measurement ring, which adjusts the tension of the strain measurement ring to simulate interaction with a virtual object.

The strain measurement ring includes a semi-rigid band coupled to a deformable band, which together encompass a portion of the user's body. The semi-rigid band includes two coupling ends each coupled to a respective coupling end of the deformable band. The semi-rigid portion has a higher elastic modulus than the deformable band. When not worn, the interior circumference of the strain measurement ring may be less than the outer circumference of the portion of the user's body. When worn, the deformable band lengthens so that the inner surface of the strain measurement ring corresponds to the outer surface of the enclosed portion of the user's body (e.g., the user's finger). When the enclosed portion of the user's body contacts a real object, the user's skin is compressed, and the circumference of the strain measurement ring decreases, resulting in strain information corresponding to the interaction with the real object. Besides measuring movement of the user's finger, the strain measurement ring may measure movement of other portions of the user's body such as the user's wrist, palm, neck, torso, arm, leg, foot, ankle, or toe.

In some embodiments, the deformable band is an elastic band. In other embodiments, the deformable band is a leaf spring having multiple layers of different lengths stacked in order of increasing length. The deformable band includes a strain-sensitive element outputting signals in response to interactions between the strain measurement ring and a real object. For example, the strain-sensitive element is a strain gauge.

In some embodiments, the strain measurement ring includes emitters to transmit strain information to a VR/AR console. The emission pattern of the emitters corresponds to the strain information. For example, the emissions are modulated to encode the strain information using a technique such as frequency, amplitude, phase modulation, or some other modulation scheme. Alternatively or additionally, the strain measurement ring sends the strain information to a communication interface that sends that strain information to the VR/AR console. For example, the strain measurement ring is included in a haptic feedback garment, which includes a processor and memory (e.g., a microcontroller and cache) to buffer measured strain information as well as a communication interface (e.g., an antenna) to transmit the strain information to the VR/AR console.

The strain measurement ring may also include a haptic feedback device to simulate contact between the user's skin and a virtual object. The haptic feedback device changes the tension of the deformable band in response to haptic command signals from the VR/AR console. As a result, the strain measurement ring applies pressure to the user's skin to simulate contact with a virtual object. Example haptic feedback devices include an actuator and an electroactive polymer.

The figures depict various embodiments of the present invention for purposes of illustration only. One skilled in the art will readily recognize from the following discussion that alternative embodiments of the structures and methods illustrated herein may be employed without departing from the principles of the disclosure described herein.

DETAILED DESCRIPTION

System Overview

Figure 1:
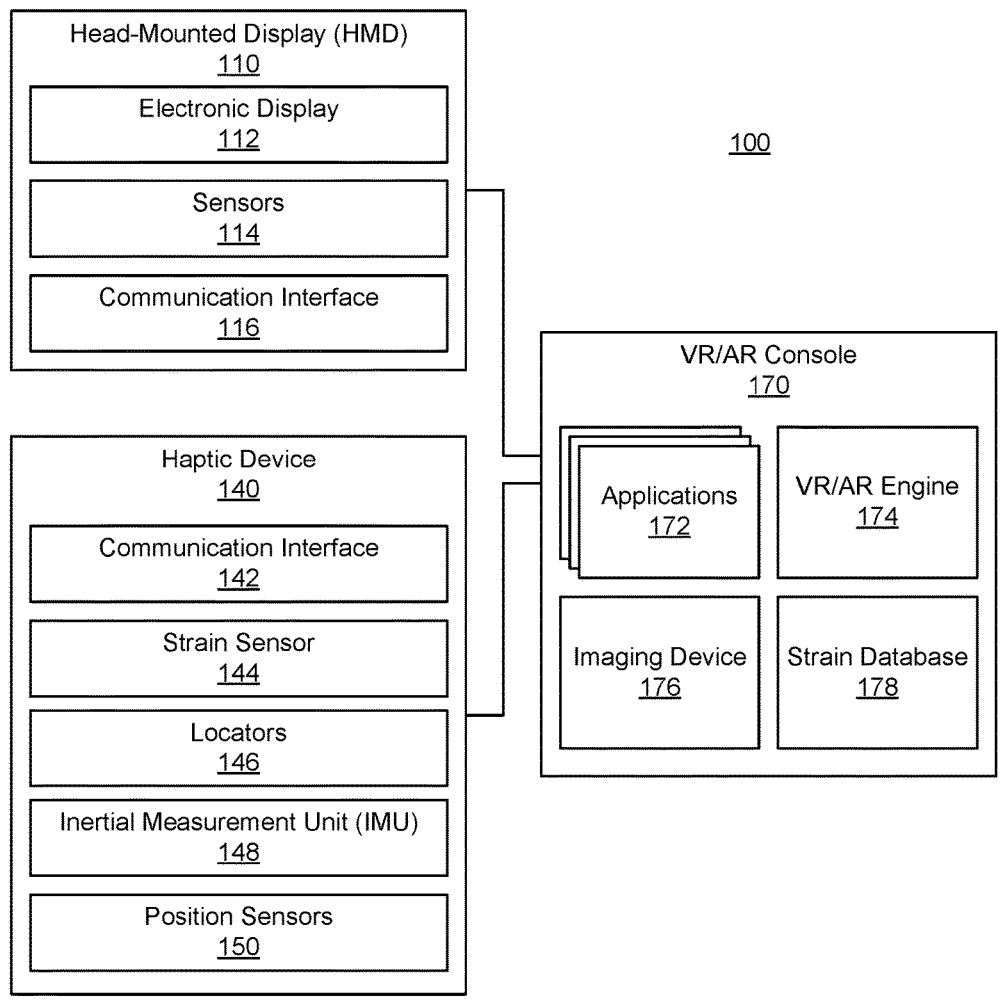
FIG. 1 is a block diagram of a virtual reality/augmented reality (VR/AR) system, in accordance with an embodiment.

FIG. 1 is a block diagram of a virtual reality and/or augmented reality (VR/AR) system 100 in which a haptic device 140 operates. The VR/AR system 100 may operate in virtual reality (VR), augmented reality (AR), and/or mixed reality (MR) environments. Virtual reality and/or augmented reality is referred to herein as VR/AR. The VR/AR system 100 shown in FIG. 1 includes a head-mounted display (HMD) 110 and a haptic device 140 that are both coupled to a VR/AR console 170. Although FIG. 1 shows an example VR/AR system 100 including one HMD 110, one haptic device 140 and one VR/AR console 170, any number of these components may be included in the VR/AR system 100. For example, the VR/AR system 100 may include two haptic devices 140 (e.g., one worn on each of the user's hands). As another example, the VR/AR system 100 may include multiple haptic devices 140 intended to be worn by multiple users, with each haptic device 140 or each pair of haptic devices 140 associated with a different HMD 110. In alternative configurations, different and/or additional components may be included in the VR/AR system 100.

The HMD 110 presents media to a user using a display mounted on the user's head. Examples of media presented by the HMD 110 include images, video, animations, audio, or some combination thereof. In some embodiments, audio is presented via an external device (e.g., speakers and/or headphones) that presents audio data based on audio information received from the HMD 110, the VR/AR console 170, or both.

The HMD 110 includes an electronic display 112, sensors 114, and a communication interface 116. The electronic display 112 displays images to the user in accordance with data received from the VR/AR console 170. In various embodiments, the electronic display 112 may comprise a single electronic display 112 or multiple electronic displays 112 (e.g., one display for each of the user's eye).

The sensors 114 include one or more hardware devices that detect spatial and motion information about the HMD 110. Spatial and motion information can include information about the position, orientation, velocity, rotation, and acceleration of the HMD 110. For example, the sensors 114 may include a gyroscope that detects rotation of the user's head while the user is wearing the HMD 110. This rotation information can then be used (e.g., by the VR/AR engine 174) to adjust the images displayed on the electronic display 112.

The communication interface 116 enables input and output to the VR/AR console 170. In some embodiments, the communication interface 116 is a single communication channel, such as High-Definition Multimedia Interface (HDMI), Universal Serial Bus (USB), Video Graphics Array (VGA), Digital Video Interface (DVI), or DisplayPort. In other embodiments, the communication interface 116 includes several distinct communication channels operating together or independently. In one embodiment, the communication interface 116 includes wireless connections for sending data collected by the sensors 114 from the HMD 110 to the VR/AR console 170 but also includes a wired HDMI connection or DVI connection that receives audio/visual data to be rendered on the electronic display 112.

The haptic device 140 is a garment worn by the user, such as on the user's hand. The haptic device 140 collects information about the portion of the user's body in contact with the haptic device 140. The collected information can be used as input for applications 172 executing on the VR/AR console 170. In the illustrated embodiment, the haptic device 140 includes a communication interface 142, one or more strain sensors 144, locators 146, an inertial measurement unit (IMU) 148, and position sensors 150. The haptic device 140 may include additional components that are not shown in FIG. 1, such as a power source (e.g., an integrated battery, a wired or wireless connection to an external power source), local memory storage, a local processor (e.g., a microcontroller), actuators, another device, or some combination thereof.

The communication interface 142 enables input and output to the VR/AR console 170. In some embodiments, the communication interface 142 is a single communication channel, such as USB. In other embodiments, the communication interface 142 includes several distinct communication channels operating together or independently, such as Bluetooth and WiFi, for example. As another example, the communication interface 142 includes one or more optical emitters that emit light corresponding to strain information describing deformation of a strain-sensitive element associated with movement of a portion of the user's body. The one or more communication channels of the communication interface 142 can be implemented as wired or wireless connections.

The strain sensors 144 include one or more hardware devices that measure strain information and/or provide haptic feedback and include a strain measurement ring, which is described further with respect to FIG. 3A, FIG. 3B, FIG. 4, and FIG. 5. The strain sensors 144 are mounted on one or more portions of a user's body and measure the strain information in response to movement of the one or more portions of the user's body. A portion of the user's body moves as a result of the user interacting with a real object or virtual object. For example, a strain sensor 144 on the user's finger detects varying deformation of the user's skin as the user exerts varying pressure on a real object. The strain information is sent to the VR/AR console 170 through the communication interface 142. In some embodiments, the strain sensors 144 may cause skin stretch on a user wearing the haptic device 140 that would occur when the user interacts with a virtual object and/or virtual surface. The strain sensors 144 may cause the skin stretch in response to haptic feedback commands from the VR/AR console 170.

The locators 146 are objects located in specific positions on the haptic device 140 relative to one another and relative to a specific reference point on the haptic device 140. A locator 146 may be a light emitting diode (LED), a corner cube reflector, a reflective marker, a type of light source that contrasts with an environment in which the haptic device 140 operates, or some combination thereof. In embodiments where the locators 146 are active (e.g., an LED), the locators 146 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 146 are located beneath an outer surface of the haptic device 140, which is transparent to the wavelengths of light emitted or reflected by the locators 146 or is thin enough not to substantially attenuate the wavelengths of light emitted or reflected by the locators 146. Additionally, in some embodiments, the outer surface or other portions of the haptic device 140 are opaque in the visible band of wavelengths of light. Thus, the locators 146 may emit light in the IR band under an outer surface that is transparent in the IR band but opaque in the visible band.

The IMU 148 is an electronic device that generates fast calibration data indicating an estimated position of the haptic device 140 relative to an initial position of the haptic device 140 based on measurement signals received from one or more of the position sensors 150. A position sensor 150 generates one or more measurement signals in response to motion of the haptic device 140. Examples of position sensors 150 include: one or more accelerometers, one or more gyroscopes, one or more magnetometers, another suitable type of sensor that detects motion, a type of sensor used for error correction of the IMU 148, or some combination thereof. The position sensors 150 may be located external to the IMU 148, internal to the IMU 148, or some combination thereof.

Based on the one or more measurement signals from one or more position sensors 150, the IMU 148 generates fast calibration data indicating an estimated position of the haptic device 140 relative to an initial position of the haptic device 140. For example, the position sensors 150 include multiple accelerometers to measure translational motion (e.g., forward/back, up/down, and left/right) and multiple gyroscopes to measure rotational motion (e.g., pitch, yaw, and roll). In some embodiments, the IMU 148 rapidly samples the measurement signals and calculates the estimated position of the haptic device 140 from the sampled data. For example, the IMU 148 integrates the measurement signals received from the accelerometers over time to estimate a velocity vector and integrates the velocity vector over time to determine an estimated position of a reference point on the haptic device 140. Alternatively, the IMU 148 provides the sampled measurement signals to the VR/AR console 170, which determines the fast calibration data. The reference point is a point that may be used to describe the position of the haptic device 140. While the reference point may generally be defined as a point in space, in practice, the reference point is defined as a point within the haptic device 140 (e.g., a center of the IMU 148).

The IMU 148 receives one or more calibration parameters from the VR/AR console 170. The one or more calibration parameters are used to maintain tracking of the haptic device 140. Based on a received calibration parameter, the IMU 148 may adjust one or more parameters (e.g., sample rate). In some embodiments, certain calibration parameters cause the IMU 148 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The VR/AR console 170 is a computing device that executes applications 172 to provide output data for the electronic display 112 and the haptic device 140 based on the input data from the sensors 114 on the HMD 110 and the haptic device 140. The VR/AR console 170 can be implemented as any kind of computing device, such as an integrated system-on-a-chip, a microcontroller, a desktop or laptop computer, a server computer, a tablet, a smart phone or other mobile device. Thus, the VR/AR console 170 includes components common to typical computing devices, such as a processor, random access memory, a storage device, a network interface, an input-output (I/O) interface, and the like.

The processor may be or include one or more microprocessors or application specific integrated circuits (ASICs). The memory may include random-access memory (RAM), read-only memory (ROM), dynamic RAM (DRAM), static RAM (SRAM) and magneto-resistive RAM (MRAM). The memory may have encoded instructions for firmware, basic input/output system (BIOS), system functions, configuration data, and other routines used during the operation of the computing device and the processor. The memory also provides a storage area for data and instructions associated with applications and data handled by the processor.

The storage device provides non-volatile, bulk, or long term storage of data or instructions in the computing device. The storage device may take the form of a magnetic or solid state disk, tape, compact disc (CD), digital versatile disc (DVD), or other addressable or serial storage media. Multiple storage devices may be provided or available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, for example and depending upon the computing device, sensors, displays, cameras, color sensors, microphones, keyboards and USB devices.

In the example shown in FIG. 1, the VR/AR console 170 further includes applications 172, a VR/AR engine 174, an imaging device 176, and a strain database 178. In some embodiments, the applications 172 and the VR/AR engine 174 are implemented as software modules that are stored on the storage device and executed by the processor. Some embodiments of the VR/AR console 170 include additional or different components than those described in conjunction with FIG. 1. Similarly, the functions further described below may be distributed among components of the VR/AR console 170 in a different manner than is described here.

Each application 172 is a group of instructions that, when executed by a processor, generates VR/AR content for presentation to the user. An application 172 may generate VR/AR content in response to inputs received from the user via movement of the HMD 110 or the haptic device 140. Examples of applications 172 include gaming applications, conferencing applications, video playback applications, or other suitable applications.

In one embodiment, the VR/AR engine 174 is a software module that allows applications 172 to operate in conjunction with the HMD 110 and haptic device 140. In some embodiments, the VR/AR engine 174 receives information from sensors 114 on the HMD 110 and provides the information to an application 172. Based on the received information, the VR/AR engine 174 determines media content to provide to the HMD 110 for presentation to the user via the electronic display 112 and/or haptic feedback to provide to the haptic device 140 to provide to the user via the strain sensors 144. For example, if the VR/AR engine 174 receives information from the sensors 114 on the HMD 110 indicating that the user has looked to the left, the VR/AR engine 174 generates content for the HMD 110 that mirrors the user's movement in a VR/AR environment.

Similarly, in some embodiments the VR/AR engine 174 receives information from the strain sensors 144 on the haptic device 140 and provides the information to an application 172. The application 172 can use the information to perform an action within a virtual world of the application 172. For example, if the VR/AR engine 174 receives information from the position sensors 150 that the user has closed her fingers around a position corresponding to a virtual coffee mug in a VR/AR environment and raises her hand to pick up the mug, a virtual hand in the application 172 picks up the virtual coffee mug and lifts it to a corresponding height. In another example, if the VR/AR engine 174 receives information from the locators 146 on the haptic device 140 indicating that the user is holding a heavy object in a VR/AR environment, then the VR/AR engine 174 generates content for the strain sensors 144 to simulate pressure on the user's hand corresponding to pressure caused by holding a heavy object in real life.

The VR/AR engine 174 may also provide feedback to the user that the action was performed. The provided feedback may be visual via the electronic display 112 in the HMD 110 (e.g., displaying the simulated hand as it picks up and lifts the virtual coffee mug) or haptic feedback via the strain sensors 144 in the haptic device 140 (e.g., stretching the skin of a user's finger's and applying pressure to the user's skin to simulate the weight of picking up a solid coffee mug).

The imaging device 176 generates slow calibration data in accordance with calibration parameters from the VR/AR console 170. Slow calibration data includes one or more images showing observed positions of the locators 146 that are detectable by the imaging device 176. The imaging device 176 may include one or more cameras, one or more video cameras, any other device capable of capturing images including one or more of the locators 146, or some combination thereof. Additionally, the imaging device 176 may include one or more filters (e.g., used to increase signal to noise ratio). The imaging device 176 is configured to detect light emitted or reflected from locators 146 in a field of view of the imaging device 176. In embodiments where the locators 146 include passive elements (e.g., a retroreflector), the imaging device 176 may include a light source that illuminates some or all of the locators 146, which reflect the light towards the light source in the imaging device 176. Slow calibration data is communicated from the imaging device 176 to the VR/AR console 170, and the imaging device 176 receives one or more calibration parameters from the VR/AR console 170 to adjust one or more imaging parameters (e.g., focal length, focus, frame rate, ISO, sensor temperature, shutter speed, aperture, etc.). The imaging device 176 may further detect light emitted by optical emitters of the haptic device 140, where the light encodes strain information output by the strain sensor 144. The VR/AR engine 174 decodes strain information from the light.

In one embodiment, the strain database 178 stores strain information received from the strain sensors 144 on haptic device 140 and information received from the VR/AR console 170 and/or HMD 110. The strain database 178 may store mappings between the received information. For example, the strain database 178 associates strain information from the strain sensors 144 with different tactile inputs to the VR/AR engine 174. Further, the strain database 178 may provide strain information to other components of the VR/AR console 170 (e.g., the applications 172) for processing. Alternatively or additionally, the strain database 178 associates light patterns from emitters included in the haptic device 140 with strain information to enable the VR/AR engine 174 to determine strain information encoded in light detected by the imaging device 176.

In some embodiments, the VR/AR console 170 may send or receive strain information from the strain database 178 via a network connection to a server inside or outside the VR/AR system 100. For instance, the VR/AR console 170 uploads strain information to a server that includes a database aggregating strain information from multiple haptic devices 140, other devices, and/or user inputs. Additionally, the VR/AR console 170 may download strain information from the server and store the strain information in the strain database 178. In other embodiments, the strain database 178 may also be stored on the haptic device 140, another component in the VR/AR system 100, or a combination thereof.

Strain Sensor

Figure 2:
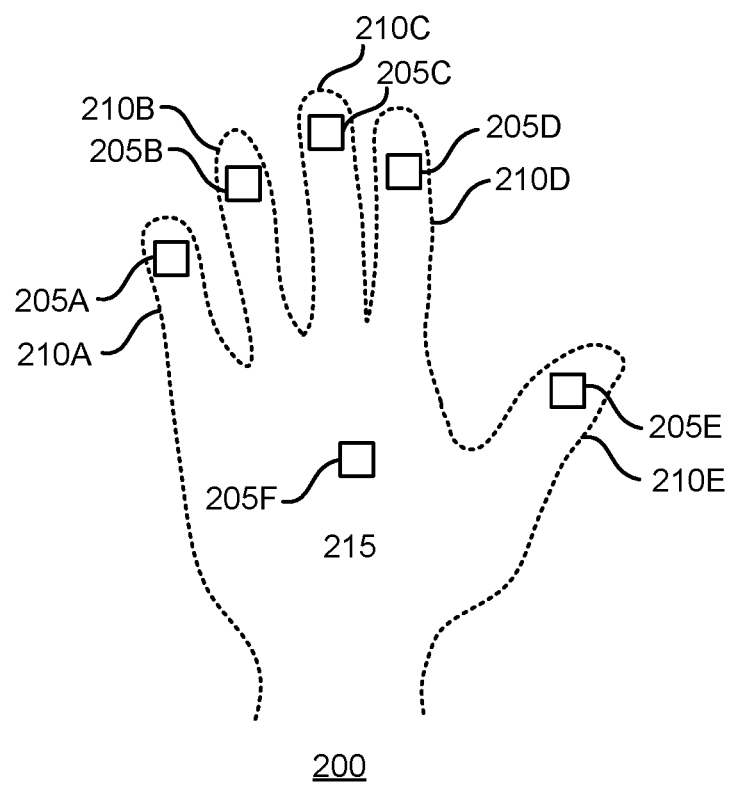
FIG. 2 illustrates a haptic glove comprising strain sensors on a user's hand, in accordance with an embodiment.

FIG. 2 illustrates a haptic glove (i.e., haptic device 140) comprising a system 200 of strain sensors 205 configured to be worn on a user's hand, in accordance with an embodiment. In the example embodiment shown in FIG. 2, the haptic device 140 comprises six strain sensors 205A, 205B, 205C, 205D, 205E, and 205F (generally, strain sensors 205), each worn near the tip of one of the fingers 210A, 210B, 210C, 210D, 210E (generally, fingers 210) or palm 215 of the user's hand. In other embodiments, the system 200 may include fewer strain sensors or more strain sensors, and the strain sensors may be worn on different locations on the user's hand, fingers 210, and/or palm. In the embodiments illustrated with FIG. 3A, FIG. 3B, FIG. 4, and FIG. 5, the strain sensors 205 are strain measurement rings.

Figure 3A:
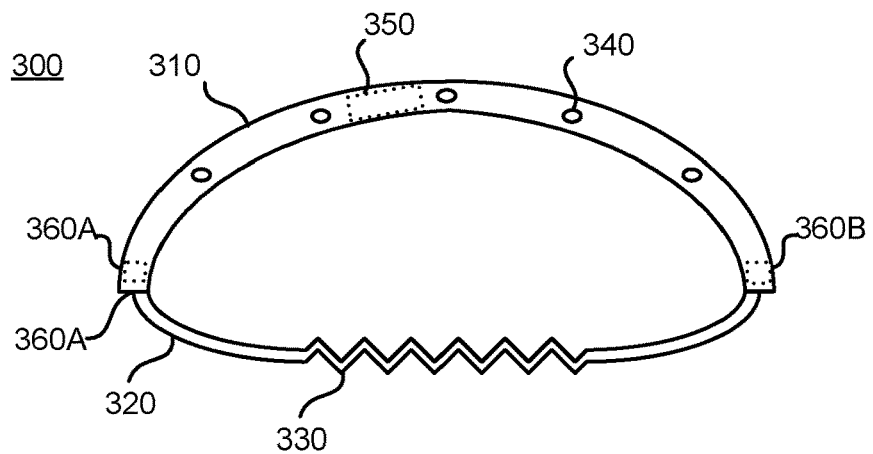
FIG. 3A illustrates a strain measurement ring, in accordance with an embodiment.
Figure 3B:
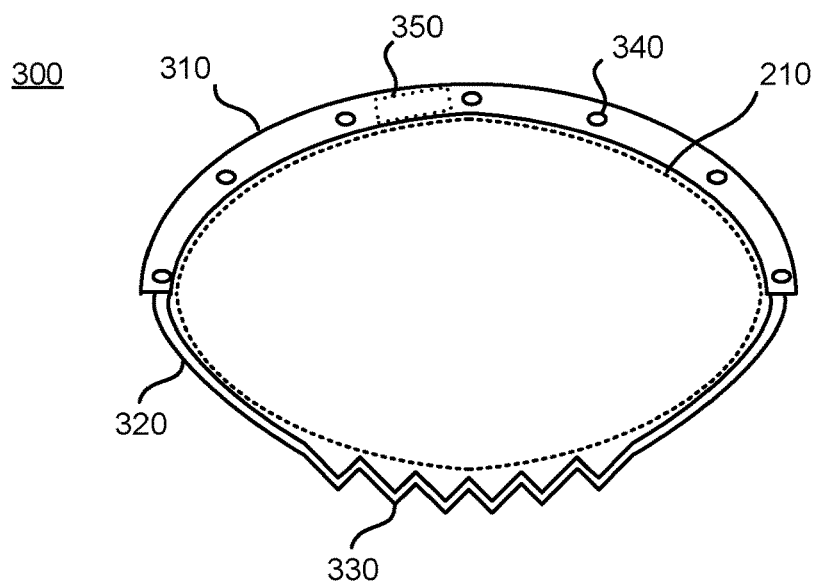
FIG. 3B illustrates a strain measurement ring on a user's finger, in accordance with an embodiment.
Figure 4:
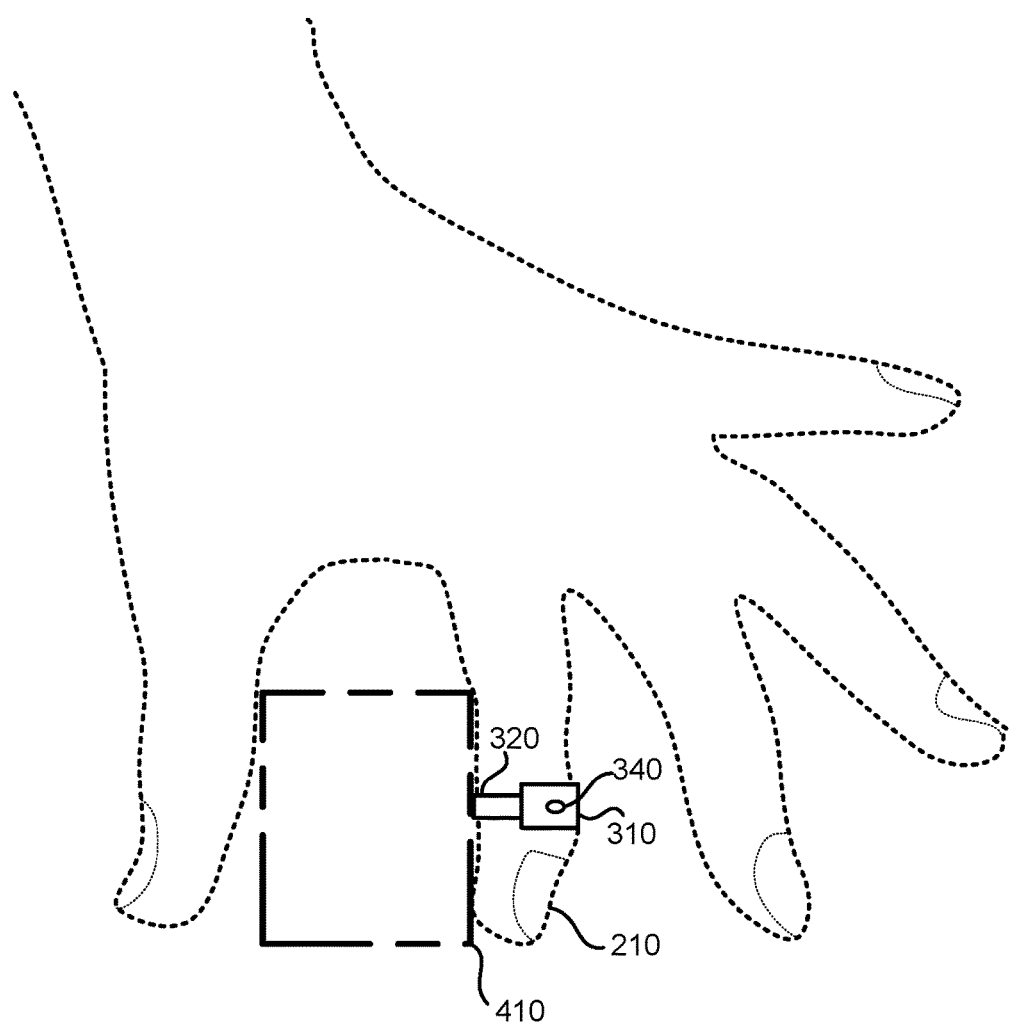
FIG. 4 illustrates a real object in contact with a strain measurement ring and a user's finger, in accordance with an embodiment.

The strain sensors 205 may measure strain information associated with movement of a portion (e.g., finger) of a user, as described further with respect to FIG. 3A, FIG. 3B, and FIG. 4. The movement may occur due to interactions with a virtual world (e.g., interactions with a virtual object, inputs to a virtual environment). The movement may also occur to interactions with real surfaces, which are surfaces that users can physically interact with in the real world. Real surfaces may be surfaces of real objects, i.e., objects that users can physically interact with in the real world. Strain refers to deflection of the strain sensor as a result of an interaction by a finger 210, palm 215, or other portion of a user's body with a real surface in the real world. For instance, when a user picks up a basketball (i.e., a real object), the weight of the basketball and the friction between the surface of the basketball (i.e., a real surface) and the user's fingers 210 causes deflection of the strain sensor. Because the user may hold heavier real objects with more pressure, real objects with heavier weight may result in more measured strain than real objects with lighter weight due to increased deformation of the user's skin and other soft tissue under the increased pressure.

Figure 5:
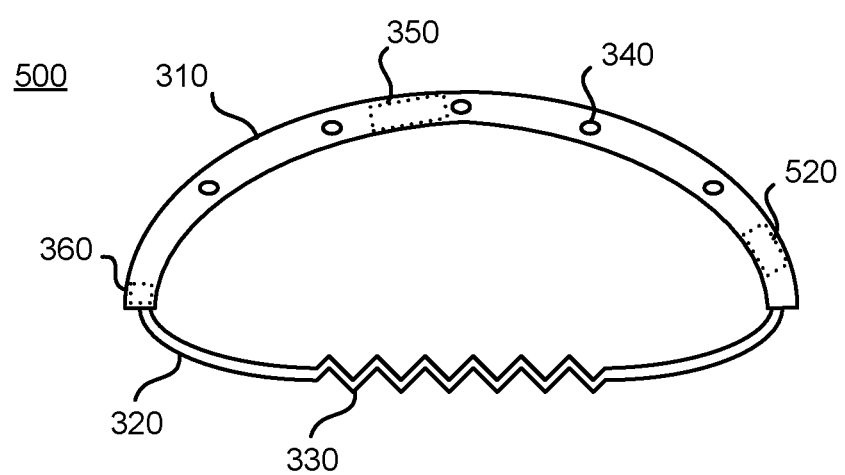
FIG. 5 illustrates a strain measurement ring including a haptic feedback device, in accordance with an embodiment.

The strain sensors may be configured to simulate pressure on a user's finger 210 in the real world when the user is interacting with virtual surfaces and/or virtual objects in the VR/AR system 100, as described further with respect to FIG. 5. Users interact with virtual surfaces and virtual objects simulated the VR/AR system 100 using the VR/AR console 170, HMD 110, and haptic device 140. For instance, the user can view a virtual lamp (i.e., a virtual object) in a VR/AR system and touch the surface of the virtual lamp (i.e., a virtual surface).

Strain Measurement Ring

FIG. 3A illustrates a strain measurement ring 300, in accordance with an embodiment. FIG. 3B illustrates the strain measurement ring 300 to be worn on a user's finger, in accordance with an embodiment. In some embodiments, the strain measurement ring 300 may be configured and appropriately sized to be worn on another portion of the user's body, such as the user's palm, wrist, toe, foot, or ankle. The illustrated strain measurement ring 300 includes a semi-rigid portion 310, a deformable band 320, a strain-sensitive element 330, one or more emitters 340, an emitter controller 350, and couplings 360A and 360B. However, the strain measurement ring 300 may include a different number of any of the illustrated components, such as fewer or additional emitters 340. Furthermore, the strain measurement ring 300 may include only a subset of the illustrated components, or additional components not illustrated.

The semi-rigid portion 310 encloses a portion of the user's finger. The semi-rigid portion 310 is shaped to conform to a backside of the user's finger, i.e., a side of the finger facing opposite the user's palm when the finger is outstretched. The semi-rigid portion 310 encompasses approximately half the circumference of the user's finger 210. In some instances, the semi-rigid portion 310 encompasses more than half or less than half the circumference of the finger 210. The semi-rigid portion 310 is general wider than it is tall. In other words, the semi-rigid portion has the shape of a partial oval, with a major axis of the oval intersecting near the ends of the semi-rigid portion 310 and a minor axis of the oval intersecting with a midpoint of the semi-rigid portion. The semi-rigid portion 310 is manufactured from a material that enables it to conform to the user's finger. For example, the semi-rigid portion 310 includes elastomeric plastic (e.g., silastic, fluorelastomer, polyester), rubber (e.g., neoprene, styrene-butadiene, chlorosulfonated polyethylene), a textile, or a combination thereof. The semi-rigid portion 310 may have a single integrally formed body or may have multiple mechanically coupled segments. For example, the semi-rigid portion 310 includes one or more jointed segments made from metal, wood, rubber, plastic, or a combination thereof. "Semi-rigid" refers to the semi-rigid band 310 experiencing significantly less deformation than the deformable band 320. For example, when the strain gauge ring experiences deformation, less than five percent of the deformation occurs due to changes in length of the semi-rigid band 320, and the remainder of the deformation occurs due to changes in length of the deformable band 320.

The deformable band 320 encloses a portion of the user's finger 210 not enclosed by the semi-rigid portion 320. The deformable band 320 conforms to a front side of the user's finger, i.e., the side of the finger facing the same direction as the user's palm when the finger is outstretched. The deformable band 320 encompasses approximately half the circumference of the user's finger 210 but may encompass more or less than half the circumference. When coupled together, the deformable band 320 and the semi-rigid portion 310 together form the strain measurement ring 300. When not worn (as illustrated in FIG. 3A), the deformable band 320 is taut, so the interior circumference of the strain measurement ring 300 is less than the circumference of the user's finger 210. When worn on the user's finger (as illustrated in FIG. 3B), the deformable band 320 is stretched, so the interior circumference of the strain measurement ring matches the circumference of the user's finger. In some embodiments, the deformable band 320 includes an elastic band (e.g., made a fabric such as nylon or elastane) that stretches along its length.

In other embodiments, the deformable band 320 has a leaf spring configuration with multiple layers. In the leaf spring configuration, a bottom layer extends a full length of the deformable band 320. One or more additional layers are stacked on the bottom layer, where the lengths of the additional layers decrease as proximity from the bottom layer decreases. The layers are centered about a midpoint of the deformable band 320, so the midpoint of the deformable band 320 is thicker than the ends of the deformable band 320 and the thickness of the deformable band 320 decreases from the midpoint of the deformable band 320 toward the ends. Since the thickness of the deformable band 320 in the leaf spring configuration varies, the midpoint of the deformable band 320 has a higher elastic modulus than the ends. The layers of the deformable band 320 in leaf spring configuration may be formed integrally or formed separately and attached (e.g., glued, fastened, sewed). Example materials for the deformable band 320 with the leaf spring configuration include fabric (e.g., elastane, nylon), elastomer, rubber, or a combination thereof.

The couplings 360A and 360B join together respective coupling ends of the semi-rigid portion 310 and deformable band 320. The coupling ends may include one or more fasteners, clips, hooks, adjustable clasps, magnets, hook-and-loop fasteners, or a combination thereof. In the illustrated strain measurement ring 300, coupling 360A secures a first coupling end of the semi-rigid portion 310 to a first coupling end of the deformable band 320, and coupling 360B secures a second coupling end of the semi-rigid portion 310 to a second coupling end of the deformable band 320. For example, coupling 360A is a rigid coupling between a pin, which is the first coupling end of the deformable band 320, and a hook, which is the first coupling end of the semi-rigid portion 310. Continuing the example, the coupling 360B is an adjustable coupling between the second coupling end of the deformable band 320 and a clasp, which is the second coupling end of the semi-rigid portion 310. As another example, both couplings 360A and 360B are rigid couplings or adjustable couplings.

The deformable band 320 includes a strain-sensitive element 330. The strain-sensitive element 330 outputs strain information in response to deformation of the deformable band 320. The strain-sensitive element 330 may measure strain in one or more directions including longitudinal deformation, lateral deformation, and vertical deformation. The strain-sensitive element 320 may include multiple strain-sensitive elements aligned in different directions, such as two or three orthogonally aligned strain-sensitive elements. The strain-sensitive element 330 may include any type of strain gauge such as a foil strain gauge. For example, deformation of a foil strain gauge causes a measurable change in electrical resistance which is correlated with an amount of strain experienced by the gauge. The strain-sensitive element 330 may also sense changes in pressure perpendicular to the deformable band due to contact against a real object or shear due to deformation. For example, the strain-sensitive element 330 may include a piezoelectric sensor.

In some embodiments, the strain measurement ring 300 includes one or more emitters 340 and an emitter controller 350 to communicate strain information to the VR/AR console 170. The emitter controller 350 receives strain information output by the strain-sensitive element 330 in response to deformation of the deformable band 320. The emitter controller 350 encodes the strain information from the strain-sensitive element 330 as driving signals to drive the emitters 340. As a result, the emission pattern of the emitters 340 corresponds to strain detected by the strain-sensitive element 330. The imaging device 176 of the VR/AR console 170 captures the light from the emitters 340, and the VR/AR engine 174 decodes the images of the captured light to determine the strain information.

An emitter 340 is a source of electromagnetic radiation that is configured to emit a modulated electromagnetic signal based on the strain information. The emitters 340 may include optical emitters emitting light in the IR band, visible band, in the ultraviolet band, or some other portion of the electromagnetic spectrum using, e.g., light emitting diodes (LEDs). The emitters 340 may include an antenna that emits radio waves (e.g., super high frequency radio waves for WiFi communication, ultra high frequency radio waves for Bluetooth or WiFi communication). The emitter controller 350 may include analog circuit elements to convert strain information from the strain-sensitive element 330 to driving signals for the emitters 340. Alternatively or additionally, the emitter controller 350 may include a microcontroller or other digital processor to output driving signals based on the strain information from the strain-sensitive element 330.

The emitter controller 350 generates a driving signal for the emitters 340 in response to the strain information output by the strain-sensitive element 330. In some embodiments, the emitter controller 350 uses modulation to generate the driving signal for the emitters 340. Modulation may include amplitude modulation, frequency modulation, phase modulation, or a combination thereof. For example, the wavelength or intensity of the emitted light corresponds to the strain information. The emitter controller 350 may drive all of the emitters 340 with the same driving signal, or the emitter controller 350 may drive different emitters 340 with different driving signals to increase bandwidth for communicating strain information and other information gathered by the strain measurement ring 300. Driving multiple emitters 340 with the same driving signal improves reliability of transmitting strain information because one or more of the emitters 340 may be obscured from the imaging device 176 due to the variable position and orientation of the strain measurement ring 300.

FIG. 4 illustrates a real object 410 in contact with a strain measurement ring 300 and a user's finger 210, in accordance with an embodiment. The real object 410 contacts the deformable band 320, resulting in increased pressure on the strain-sensitive element 330 and the user's finger 210. Because the user's finger 210 is deformed away from the real object 410, the length of the deformable band 320 decreases, and the strain-sensitive element 330 measures a local decrease in the length of the deformable band 320. The strain-sensitive element 330 outputs strain information, which the controller 350 converts to driving signals for one or more emitters 340. Alternatively, the strain information is output to the communication interface 142 of the haptic device 140, which transmits the strain information to the VR/AR console 170.

Haptic Feedback

FIG. 5 illustrates a strain measurement ring 500 including a haptic feedback device, in accordance with an embodiment. The strain measurement ring 500 is substantially the same as the strain measurement ring 300, except that it additionally includes a dynamic coupling 520.

The static coupling 360 secures a first coupling end of the deformable band 320 to a first coupling end of the semi-rigid portion 310. The static coupling 360 may include any coupling not controlled in response to haptic command signals from the VR/AR console 170.

The dynamic coupling 520 secures a second coupling end of the deformable band 320 to a second coupling end of the semi-rigid portion 320. The dynamic coupling 520 adjusts the tension or length of the deformable band 320 in response to a haptic command signal from the VR/AR console 170. For example, the dynamic coupling 520 includes an actuator fixed to the second coupling end of the deformable band 320. The actuator is mounted in the semi-rigid portion 310. The actuator extends or retracts the second coupling end of the deformable band 320 in response to haptic command signals from the VR/AR console 170. As a result, the tension of the deformable band 320 increases or decreases, which results in increased or decreased normal force and friction against the user's finger 210 to simulate the finger 210 contacting a virtual object. For example, the VR/AR engine 174 outputs a haptic command signal, and the actuator provides haptic feedback in response to the haptic command signal. The haptic command signal is received through, e.g., the communication interface 142. The actuator may be any actuator using hydraulic, magnetic, pneumatic, electric, mechanical (e.g., rack and pinion), or other means to translate the haptic command signal to motion.

Alternatively or additionally, the deformable band 320 includes an electroactive polymer that expands or contracts in response to the haptic command signal, thereby obviating an actuator. In such a case, the semi-rigid band 310 may include a band controller that, in response to the haptic command signal, outputs an electrical field that activates the electroactive polymer.

The preceding discussion of embodiments refers to a haptic device 140 that is adapted to measure information about strain on a user's fingers due to pressure of a real object and/or cause to cause pressure on a user's fingers to simulate pressure of a virtual object. However, in other embodiments, the systems described herein can be adapted to other types of garments that track movement of other parts of the body. For example, the systems disclosed may be applied to garments that deform in response to movement or deformation of skin on the user's face, arm, chest, back, feet, and the like.

Additional Configuration Considerations

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device comprising:
a semi-rigid band shaped to form a first portion of a strain measurement ring that is configured to be worn on a user's finger, the semi-rigid band having a first coupling end and a second coupling end;
a deformable band shaped to form a second portion of the strain measurement ring, the deformable band having a third coupling end and a fourth coupling end, the third coupling end coupled to the first coupling end and the fourth coupling end coupled to the second coupling end to form the strain measurement ring, the deformable band including:
a strain-sensitive element configured to output strain information in response to a deformation of the strain-sensitive element, wherein the strain information describes the deformation and the deformation is associated with a movement of the user's finger; and
wherein the semi-rigid band includes an actuator configured to move one of the coupling ends of the deformable band in response to a haptic command signal from a console.

2. The device of claim 1, further comprising an emitter configured to emit a modulated electromagnetic signal based on the strain information.

3. The device of claim 2, wherein the emitter is an optical emitter mounted to the semi-rigid band, and the modulated electromagnetic signal is in the infrared.

4. The device of claim 1, wherein the deformable band includes a leaf spring comprising a plurality of layers, each layer having a different length, the plurality of layers stacked in order of length.

5. The device of claim 1, wherein the deformable band includes an elastic band.

6. The device of claim 1, wherein the strain measurement ring forms an oval shape having a minor axis corresponding to a midpoint of the semi-rigid band between the first and second coupling ends, the minor axis further corresponding to a midpoint of the deformable band between the third and fourth coupling ends, wherein the deformable band is configured to stretch to conform to the user's finger when the strain measurement ring is worn on the user's finger.

7. The device of claim 1, wherein movement of the one of the coupling ends is configured to stimulate the user's finger responsive to the user's finger interacting with a virtual object.

8. A device comprising:
a semi-rigid band shaped to form a first portion of a strain measurement ring that is configured to be worn on a user's finger, the semi-rigid band having a first coupling end and a second coupling end;
a deformable band shaped to form a second portion of the strain measurement ring, the deformable band having a third coupling end and a fourth coupling end, the third coupling end coupled to the first coupling end and the fourth coupling end coupled to the second coupling end to form the strain measurement ring, the deformable band including:
a strain-sensitive element configured to output strain information in response to a deformation of the strain-sensitive element, wherein the deformation is associated with an interaction between the user's finger and a real object; and
wherein the semi-rigid band includes an actuator configured to move one of the coupling ends of the deformable band in response to a haptic command signal from a console.

9. The device of claim 8, further comprising an emitter configured to emit a modulated electromagnetic signal based on the strain information.

10. The device of claim 9, wherein the emitter is an optical emitter mounted to the semi-rigid band, and the modulated electromagnetic signal is in the infrared.

11. The device of claim 8, wherein the deformable band includes a leaf spring comprising a plurality of layers, each layer having a different length, the plurality of layers stacked in order of length.

12. The device of claim 8, wherein the deformable band includes an elastic band.

13. The device of claim 8, wherein the strain measurement ring forms an oval shape having a minor axis corresponding to a midpoint of the semi-rigid band between the first and second coupling ends, the minor axis further corresponding to a midpoint of the deformable band between the third and fourth coupling ends, wherein the deformable band stretches to conform to the user's finger when the strain measurement ring is worn on the user's finger.

14. The device of claim 8, wherein movement of the one of the coupling ends is configured to stimulate the user's finger responsive to the user's finger interacting with a virtual object.

15. A device comprising:
a semi-rigid band shaped to form a first portion of a strain measurement ring that is configured to be worn on a user's finger, the semi-rigid band having a first coupling end and a second coupling end;
a deformable band shaped to form a second portion of the strain measurement ring, the deformable band having a third coupling end and a fourth coupling end, the third coupling end coupled to the first coupling end and the fourth coupling end coupled to the second coupling end to form the strain measurement ring, the deformable band including:
a strain-sensitive element configured to output strain information in response to a deformation of the strain-sensitive element, wherein the deformation is associated with a movement of the user's finger;
wherein the strain measurement ring forms an oval shape having a minor axis corresponding to a midpoint of the semi-rigid band between the first and second coupling ends, the minor axis further corresponding to a midpoint of the deformable band between the third and fourth coupling ends, wherein the deformable band stretches to conform to the user's finger when the strain measurement ring is worn on the user's finger, and wherein the semi-rigid band includes an actuator configured to move one of the coupling ends of the deformable band in response to a haptic command signal from a console;
an emitter configured to emit a modulated electromagnetic signal based on the strain information; and
a controller configured to encode the strain information into a driving signal for the emitter.

16. The device of claim 15, wherein the emitter includes a plurality of optical emitters mounted to the semi-rigid band.

17. The device of claim 15, wherein the emitter is an optical emitter mounted to the semi-rigid band, and the modulated electromagnetic signal is in the infrared.

18. The device of claim 15, wherein the deformable band includes a leaf spring comprising a plurality of layers, each layer having a different length, the plurality of layers stacked in order of length.

19. The device of claim 15, wherein the deformable band includes an elastic band.

20. The device of claim 15, wherein movement of the one of the coupling ends is configured to stimulate the user's finger responsive to the user's finger interacting with a virtual object.

* * * * *